2,926,131
CATALYTIC CRACKING PROCESS

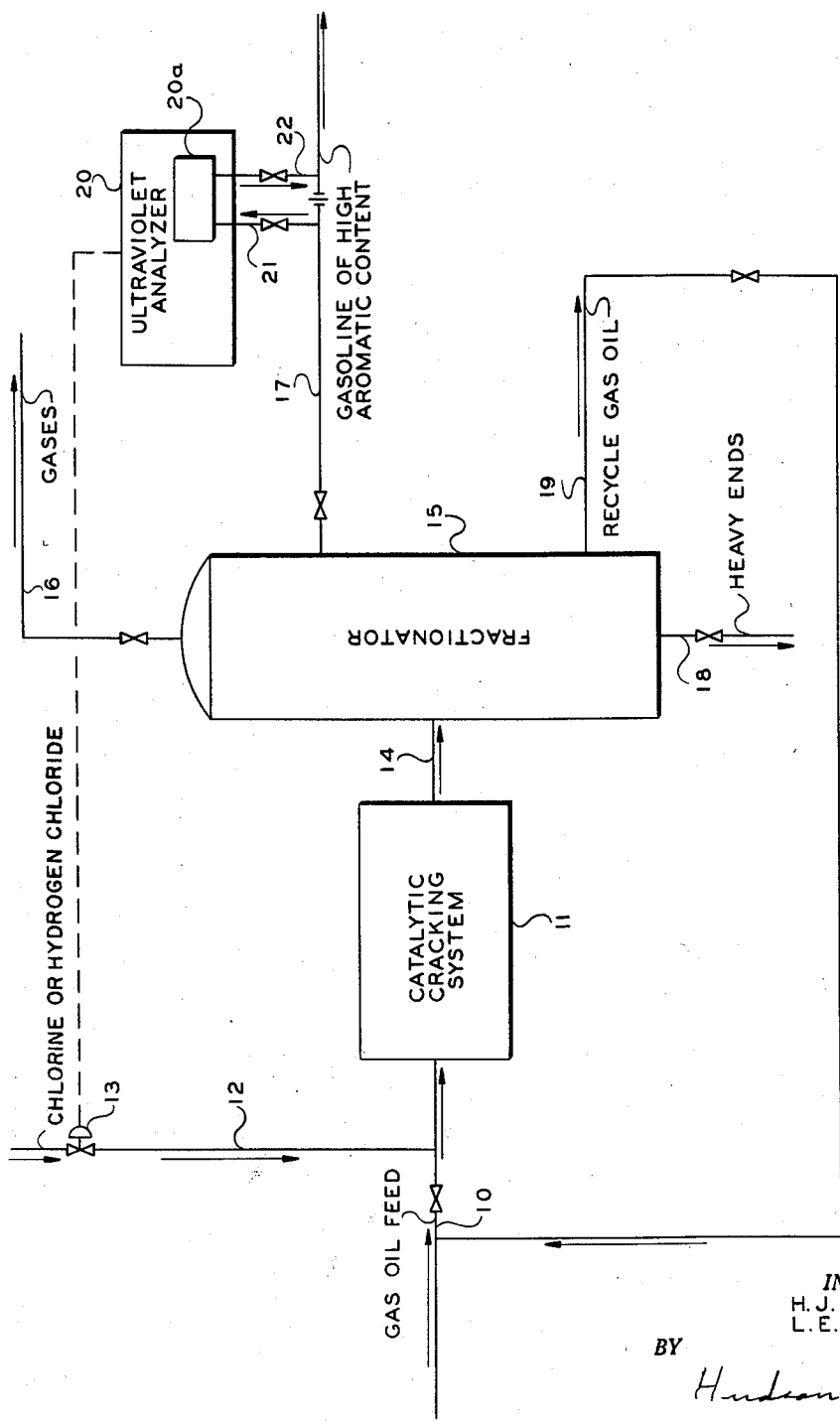

Harold J. Hepp and Lewis E. Drehman, Bartlesville, Okla., assignors to Phillips Petroleum Company, a corporation of Delaware Application January 16, 1956, Serial No. 559,146

10 Claims. (Cl. 208—115)

This invention relates to a catalytic cracking process.

Catalytic cracking of gas oils to form gasoline has been extensively practiced for many years. In this art, improvements have been constantly sought which increase the octane rating of the gasoline. One way in which an improvement in octane rating can be obtained is by an increase in the aromatic content of the cracked gas oil.

We have found that the percentage of aromatic components in the gasoline can be substantially increased by incorporating a small amount of chlorine or hydrogen chloride in the feed to the cracking zone. When the chlorine is added in the form of hydrogen chloride, other important advantages are obtained, especially an increase in the activity of the catalyst which can be any of the natural or synthetic clay cracking catalysts. Further in accordance with the invention, gasoline of controlled aromatic content is produced by regulating the amount of added chlorine or hydrogen chloride fed to the cracking system.

Accordingly, it is an object of the invention to provide an improved cracking process.

It is a further object to provide a cracking process resulting in an increased production of aromatic components in the gasoline.

Various other objects, advantages and features of the invention will become apparent from the following detailed description taken in conjunction with the accompanying drawing, in which the figure is a flow diagram illustrating the invention.

Referring now to the drawing, the gas oil to be converted is fed through a valved line 10 to a catalytic cracking system 11. The feed to be cracked can be any of the usual cracking stocks, specifically, a light gas oil boiling within the range of 400 to 700° F., or a heavy gas oil boiling within the range of 700 to 850° F., or even 700 to 1100° F. The charging stock can be a virgin gas oil or a recycle gas oil, as will hereinafter become apparent.

The cracking system can be any of the types known to those skilled in the art wherein a clay cracking catalyst is utilized. Specifically, a fixed bed, fluid bed, or moving bed cracking system can be employed. The catalyst can be a natural or synthetic clay catalyst, such as silica-alumina, silica-magnesia, acid-treated montmorillonite or bentonite or bauxite activated by controlled heating. The processing conditions within the cracking system 11 are those employed in conventional catalytic cracking systems. For example, atmospheric or slightly higher pressures can be utilized with cracking temperatures in the range of 850° F. to 1050° F., more specifically, 875° F. to 975° F.

In accordance with the invention, chlorine or hydrogen chloride is admixed with the feed to the cracking system in an amount sufficient to materially increase the amount of aromatic components used in the cracking operation. The amount of chlorine or hydrogen chloride required can vary within the range of 0.001 to 1 weight percent of the hydrocarbon charged. Higher amounts can be used but are, of course, less economical. Indeed, the improved aromatic production of the invention is attained where the chlorine or hydrogen chloride content varies from 0.001 to 0.5 weight percent of the hydrocarbon charge in existing commercial systems. The chlorine or hydrogen chloride is admixed with the feed and enters the system through a line 12, flow through which is controlled by a motor valve 13.

The addition of chlorine or hydrogen chloride in the manner stated produces a substantial increase in aromatic content of the gasoline, as further indicated by the data hereinafter presented, with resulting increase in the octane number of the gasoline. Where the chlorine is added in the form of hydrogen chloride, additional important advantages are obtained. In particular, the addition of hydrogen chloride increases the activity of the catalyst with the result that increased throughput at a given conversion or increased conversion at a given throughput with existing equipment can be obtained. In building a new refining system, the size of the equipment required to effect a specified throughput and conversion of charge stock can be substantially reduced. As still another alternative a less costly catalyst of relatively low activity can be used and the cracking ability of the catalyst increased to a higher level by practice of the invention. In still another application, a catalyst whose activity has dropped through continued cracking and regeneration to such a point that continued use would be uneconomical, can be effectively utilized for a further length of time by addition of hydrogen chloride to the reaction zone in accordance with the invention.

The effluent of increased aromatic content is fed through a line 14 to a fractionating system 15 which produces a top gaseous fraction through a line 16, a gasoline side cut through a line 17, a heavy bottom product through a line 18 and a recycle gas oil through a line 19. This recycle gas oil can be admixed with the fresh or virgin gas oil feed passing through line 10.

In accordance with a further feature of the invention, the gasoline fraction produced through line 17 is sampled by an ultraviolet analyzer 20 which produces an electrical output representative of the aromatic content of the gasoline. To this end, a valved sample line 21 withdraws a small portion of the gasoline fraction and transmits same to an analyzer cell 20a, the sample being returned through a valved sample line 22. A beam of ultraviolet radiation passes through the sample, and a transducer is employed to produce an output representative of the beam intensity after its passage through the sample which output is a function of the aromatic content of the gasoline.

The output of the analyzer 20 can be utilized to control motor valve 13 and thus vary the flow of chlorine or hydrogen chloride to the cracking system 11 in such fashion as to maintain a predetermined aromatic content, substantially higher than the aromatic content of gasolines produced by conventional catalytic cracking systems.

The following illustrate the improvements and increased aromatic production obtained by practice of the invention.

EXAMPLE I

Cetane was passed over a silica-alumina catalyst (84% silica, 10% zirconia, 4% alumina and 2% water) at atmospheric pressure, a temperature of 920 to 940° F. and a liquid hourly space velocity of approximately two. The catalyst was regenerated between each period by burning off the coke. In periods 1, 2, and 3, where no additive was present in the feed, conversion decreased from an initial 54.0 percent to 42.1 percent due to loss of catalyst activity. Corresponding products compositions are listed. In period 4, 0.38 percent of HCl was added to the feed, and conversion was restored nearly to the initial value. Comparing periods 1 and 4, it will be seen that gasoline yield was increased by 1.2 percent and that the gasoline in period 4 contained somewhat less olefins, and twice as much aromatics as in period 1.

Table I

| Period | 1 | 2 | 3 | 4 |
|---|---|---|---|---|
| Time on stream—hrs | 2.00 | 2.00 | 2.00 | 2.00 |
| Average Temperature, °F.: | | | | |
| Top | 902 | 937 | 921 | 931 |
| Middle | 916 | 934 | 939 | 936 |
| Bottom | 934 | 944 | 947 | 926 |
| Overall average temperature °F | 917 | 938 | 936 | 931 |
| Space velocity—vol./vol. cat./hr | 2.18 | 1.96 | 2.02 | 2.04 |
| Weight percent HCl in feed | 0.00 | 0.00 | 0.00 | 0.38 |
| Conversion, percent | 54.0 | 49.8 | 42.1 | 53.0 |
| Products—Percent of converted cetane: | | | | |
| Gas— | | | | |
| $C_3$ and lighter | 23.8 | 22.1 | 20.7 | 23.8 |
| $C_4$'s | 30.1 | 29.3 | 28.4 | 29.2 |
| Gasoline (50–430° F.) | 40.6 | 41.1 | 46.5 | 41.8 |
| Kerosene (430–500° F.) | 3.0 | 4.8 | 2.4 | 1.0 |
| Heavy ends (530° F.+) | 2.0 | 1.9 | 3.7 | 3.2 |
| Coke (C+H) | 0.5 | 0.8 | 0.7 | 0.04 |
| Compositions of gasoline—vol. percent: | | | | |
| Olefins } by FIA method | { 54.0 | 59.5 | 61.4 | 49.4 |
| Aromatics } | { 7.3 | 5.9 | 4.2 | 14.0 |
| $C_5$'s (50–110° F.) | 78 | 78 | -------- | 43.8 |
| $C_6$'s (110–180° F.) | ---- | ---- | -------- | 31.8 |
| Olefins in gas sample—by Orsat | 56.4 | 57.5 | 55.8 | 57.2 |
| $H_2$ in gas sample—by Orsat | ------- | ------- | 13.6 | 14.4 |
| Percent Cl in gasoline | ------- | ------- | ------- | 0.287 |
| Bromine No. of gasoline | 121.4 | 128.2 | 133.4 | 116.3 |
| $N^{20}_D$ of gasoline | ------- | 1.3908 | 1.3877 | 1.3911 |
| $D^{20}_4$ of gasoline | ------- | .6788 | .6730 | .6813 |

It will be noted, from the foregoing data, that the aromatic content of the gasoline was practically doubled, on comparing the run with hydrogen chloride added to the feed with the run producing the highest aromatic content without hydrogen chloride addition. By comparing runs 3 and 4, it will be noted that aromatic production was more than tripled under these particular conditions. Further, the activity of the catalyst was substantially increased, and there was no reaction of the hydrogen chloride with the catalyst to form silicon tetrachloride, corresponding to the formation of silicon tetrafluoride when fluorine compounds are added to the feed. Finally, the foregoing data clearly illustrate restoration of catalyst activity to substantially its original level as a result of incorporating the hydrogen chloride after a decline in catalyst activity had occurred.

EXAMPLE II

Chlorine was added to the feed to a catalytic cracking operation wherein a Thermofor catalytic cracking catalyst was utilized. The catalyst composition was about 88 weight percent silica with the remainder being alumina. The run duration was one hour.

Table II

| | Control | | Control with 0.75% Chlorine added | |
|---|---|---|---|---|
| Conversion | 25.2 | | 23.8 | |
| | Percent Chg. | Net | Percent Chg. | Net |
| Dry Gas, wt | 5.9 | 23.4 | 5.3 | 22.3 |
| $C_2$'s, vol | 1.4 | 5.6 | 0.7 | 2.9 |
| $C_3$'s, vol | 4.6 | 18.2 | 4.4 | 18.5 |
| $C_4$'s, vol | 5.3 | 21.0 | 4.7 | 19.8 |
| $C_4$ total vol | 9.4 | 37.3 | 9.1 | 38.3 |
| $C_4$–400° F. vol | 22.6 | 89.8 | 21.4 | 90.0 |
| $C_5$–400° F. vol | 13.2 | 52.4 | 12.3 | 51.7 |
| Carbon, wt | 0.58 | 2.3 | 0.66 | 2.8 |
| Gasoline: | | | | |
| 10% Point | 136 | | 132 | |
| Aromatic | 11.8 | | 16.9 | |
| Olefin | 56.2 | | 56.7 | |
| Paraffins and naphthenes | 32.0 | | 26.4 | |
| RI, 20 | 1.3981 | | 1.4000 | |
| Space Rate, cc./min | 4.7 | | 5.12 | |
| Temp., °F | 903 | | 904 | |
| Press., p.s.i.g | atm. | | atm. | |

The foregoing data show that the addition of chlorine produced approximately a 50 percent increase in the amount of aromatics in the gasoline, thus demonstrating that improved aromatic yield results directly from the chlorine addition, whether it be added as such or in the form of hydrogen chloride.

While the invention has been described in connection with present, preferred embodiments thereof, it is to be understood that this description is illustrative only and is not intended to limit the invention.

We claim:

1. An improved catalytic cracking process comprising contacting, at a cracking temperature, a clay cracking catalyst with a previously formed mixture consisting of gas oil and hydrogen chloride.

2. An improved catalytic cracking process comprising forming a mixture by introducing 0.001 to 1 weight percent of a composition consisting of hydrogen chloride into a gas oil having a boiling range of 400 to 1100° F.; and then, at a temperature of 850 to 1050° F., contacting a catalyst with said mixture.

3. An improved catalytic cracking process comprising forming a mixture by introducing 0.001 to 0.5 weight percent of a composition consisting of hydrogen chloride into a gas oil having a boiling range of 400 to 1100° F.; and then, at a temperature of 850 to 1050° F., contacting a catalyst with said mixture.

4. An improved catalytic cracking process comprising contacting, at a temperature of 875 to 975° F., a silica-zirconia-alumina cracking catalyst with a previously formed mixture consisting of cetane and about 0.4 weight percent of hydrogen chloride based on the cetane.

5. In a catalytic cracking process, the steps which comprise feeding a gas oil to a catalytic cracking zone containing a clay cracking catalyst, admixing a sufficient amount of a material selected from the group consisting of chlorine and hydrogen chloride with the feed to said cracking zone to increase the aromatic content of the resulting gasoline, fractionating the effluent from the cracking zone to produce a gasoline fraction, passing a beam of ultraviolet radiation through a portion of said gasoline fraction to produce an output representative of the aromatic content of the gasoline fraction, and controlling the amount of said material admixed with the feed in accordance with said output to maintain the aromatic content of the gasoline fraction at a preselected value.

6. The method for producing aromatic hydrocarbons comprising, forming an admixture consisting of a gas oil and a chlorine compound selected from the group consisting of chlorine and hydrogen chloride, contacting the resulting admixture in a reaction zone with a clay catalyst at a temperature in the range of 850 to 1050° F., and fractionating the effluent from said reaction zone to obtain a fraction of increased aromatic content.

7. The method of producing aromatic hydrocarbons comprising, forming an admixture consisting of a gas oil boiling in the boiling point range of from 400 to 1100° F. and a chlorine compound selected from the group consisting of chlorine and hydrogen chloride, said chlorine compound amounting to less than 1 percent by weight of the admixture, contacting the resulting admixture in a reaction zone with a clay catalyst at a temperature in the range of 850 to 1050° F., and fractionating the effluent from said reaction zone to obtain a fraction of increased aromatic content.

8. The method of producing aromatic hydrocarbons comprising, forming an admixture consisting of a gas oil boiling in the boiling point range of from 400 to 1100° F. and hydrogen chloride in an amount in the range of from 0.001 to 1 weight percent of the admixture, contacting the resulting admixture in a reaction zone with a clay catalyst at a temperature in the range of 850 to 1050° F., and fractionating the effluent from said reaction zone to obtain a fraction of increased aromatic content.

9. The method of producing aromatic hydrocarbons comprising, forming an admixture consisting of a gas oil boiling in the boiling point range of from 400 to 1100° F. and chlorine in an amount in the range of from 0.001 to 1 weight percent of the admixture, contacting the resulting admixture in a reaction zone with a clay catalyst at a temperature in the range of 850 to 1050° F., and fractionating the effluent from said reaction zone to obtain a fraction of increased aromatic content.

10. The method for producing aromatic hydrocarbons comprising, admixing a cetane fraction with about 0.4 weight percent of a composition consisting of hydrogen chloride, contacting the resulting admixture with a silica-zirconia-alumina catalyst in a reaction zone at a temperature in the range of from 875 to 975° F., and fractionating the effluent from said reaction zone to obtain a fraction containing approximately 50 volume percent more aromatic hydrocarbons than the original cetane fraction.

References Cited in the file of this patent

UNITED STATES PATENTS

| | | |
|---|---|---|
| 1,606,246 | Lea et al. | Nov. 9, 1926 |
| 2,129,649 | Cross | Sept. 13, 1938 |
| 2,213,345 | Marschner | Sept. 3, 1940 |
| 2,246,900 | Schulze | June 24, 1941 |
| 2,291,588 | Kalichevsky et al. | July 28, 1942 |
| 2,315,024 | Sturgeon | Mar. 30, 1943 |
| 2,350,828 | Schmerling | June 6, 1944 |
| 2,387,989 | Foster | Oct. 30, 1945 |
| 2,397,638 | Bell et al. | Apr. 2, 1946 |
| 2,406,613 | Lee et al. | Aug. 27, 1946 |
| 2,430,724 | Meadow | Nov. 11, 1947 |
| 2,525,812 | Lien et al. | Oct. 17, 1950 |
| 2,642,384 | Cox | June 16, 1953 |
| 2,706,253 | Hutchins | Apr. 12, 1955 |